United States Patent
Jain

(10) Patent No.: US 10,402,465 B1
(45) Date of Patent: Sep. 3, 2019

(54) CONTENT AUTHORITY RANKING USING BROWSING BEHAVIOR

(71) Applicant: Amazon Technologies, Inc., Seattle, WA (US)

(72) Inventor: Saral Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1045 days.

(21) Appl. No.: 14/498,691

(22) Filed: Sep. 26, 2014

(51) Int. Cl.
*G06F 7/00* (2006.01)
*G06F 17/30* (2006.01)
*G06F 16/957* (2019.01)
*H04L 29/08* (2006.01)
*G06F 17/00* (2019.01)

(52) U.S. Cl.
CPC ............ *G06F 16/957* (2019.01); *H04L 67/22* (2013.01)

(58) Field of Classification Search
CPC ... G06F 17/30899; G06F 16/957; H04L 67/22
See application file for complete search history.

(56) References Cited

U.S. PATENT DOCUMENTS

| | | | | |
|---|---|---|---|---|
| 9,032,289 B1* | 5/2015 | Cierniak | ............ | G06F 17/30882 715/230 |
| 2009/0182725 A1* | 7/2009 | Govani | ............. | G06F 17/30864 |
| 2010/0088331 A1* | 4/2010 | White | ............... | G06F 16/24578 707/759 |
| 2010/0287050 A1* | 11/2010 | Jones | ...................... | G06Q 30/02 705/14.58 |
| 2011/0119264 A1* | 5/2011 | Hu | .......................... | G06Q 10/00 707/728 |
| 2011/0225140 A1* | 9/2011 | Wu | ..................... | G06F 16/9535 707/709 |
| 2013/0018967 A1* | 1/2013 | Gannu | ............. | G06F 17/30902 709/206 |
| 2013/0164714 A1* | 6/2013 | Hunt | .................... | G09B 19/167 434/65 |
| 2013/0318180 A1* | 11/2013 | Amin | .................... | H04L 65/403 709/206 |

* cited by examiner

*Primary Examiner* — Kannan Shanmugasundaram
(74) *Attorney, Agent, or Firm* — Knobbe, Martens, Olson & Bear, LLP

(57) ABSTRACT

An intermediary system operates as an intermediary between content servers and user devices, and provides services for determining page authority based on user browsing behavior. One such service involves receiving user browsing behavior from at least one browser on a user device and using the browsing behavior to assign an authority ranking to a content page (e.g., web page). The intermediary system can determine the content page authority based on explicit user authority rankings and/or implicit authority indications in page traffic data.

22 Claims, 8 Drawing Sheets

Explicit Authority Associations 305

| Page | User Weight | User Score | User-Given Quality Score |
|---|---|---|---|
| A.com | 2 | 3 | 4.76 |
|  | 6 | 5 |  |
|  | 7 | 5 |  |
|  | 4 | 4 |  |
|  | 2 | 4 |  |
| B.org | 1 | 5 | 3.40 |
|  | 4 | 3 |  |
| C.net | 10 | 4 | 4.00 |
| D.gov | 10 | 1 | 1.65 |
|  | 7 | 2 |  |
|  | 3 | 3 |  |
| E.edu | 10 | 5 | 4.59 |
|  | 9 | 5 |  |
|  | 2 | 3 |  |
|  | 8 | 4 |  |

*Fig. 3A*

Implicit Authority Associations 310

| Page | Total Visits | Site Duration (days) | Avg. Visit Duration (seconds) | Visits Within X Timeframe | Traffic-Based Score |
|---|---|---|---|---|---|
| A.com | 15,000,000 | 1,825 | 2,700 | 1,500,000 | 44,434,967 |
| B.org | 4,000,000 | 3,650 | 1,200 | 200,000 | 5,453,085 |
| C.net | 9,000 | 730 | 510 | 90 | 15,288 |
| D.gov | 100,000 | 5,475 | 240 | 2,000 | 104,411 |
| E.edu | 300,000,000 | 7,300 | 900 | 6,000,000 | 599,501,776 |

*Fig. 3B*

Global Authority Ranking 315

| Page | User-Given Quality Score | Traffic-Based Score | Global Authority |
|---|---|---|---|
| A.com | 4.76 | 44,434,967 | 97 |
| B.org | 3.40 | 5,453,085 | 90 |
| C.net | 4.00 | 15,288 | 35 |
| D.gov | 1.65 | 104,411 | 30 |
| E.edu | 4.59 | 599,501,776 | 100 |

*Fig. 3C*

Categorical Authority 320

| Page | Ranking Category | Categorical Authority |
|---|---|---|
| A.com | Users browsing in French | 98 |
| | Users between the ages of 10-15 | 11 |
| | Users who like cooking | 92 |
| B.org | Users browsing at night | 97 |
| C.net | Users who like science | 90 |
| D.gov | Users seeking drivers license information | 100 |
| | Users seeking cooking recipes | 5 |
| E.edu | PC users | 91 |
| | Mobile device users | 56 |

*Fig. 3D*

CONTENT AUTHORITY RANKING USING BROWSING BEHAVIOR

BACKGROUND

Page authority represents the relevance of content, e.g. information and links, within pages to one another, and domain authority represents the reliability of the domain and relevance of the domain to a topic, for example a search keyword. Conventionally, authority rankings for pages and domains are based on the link structure of a network (e.g., the Internet). For example, authority values for a page might be determined based on the quantity and quality of other pages and domains that include links to that page. In many cases, however, these authority measures do not accurately reflect users' perceptions.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A-3D illustrate various examples of authority association mappings and corresponding authority rankings.

DETAILED DESCRIPTION

Introduction

Figure 1:
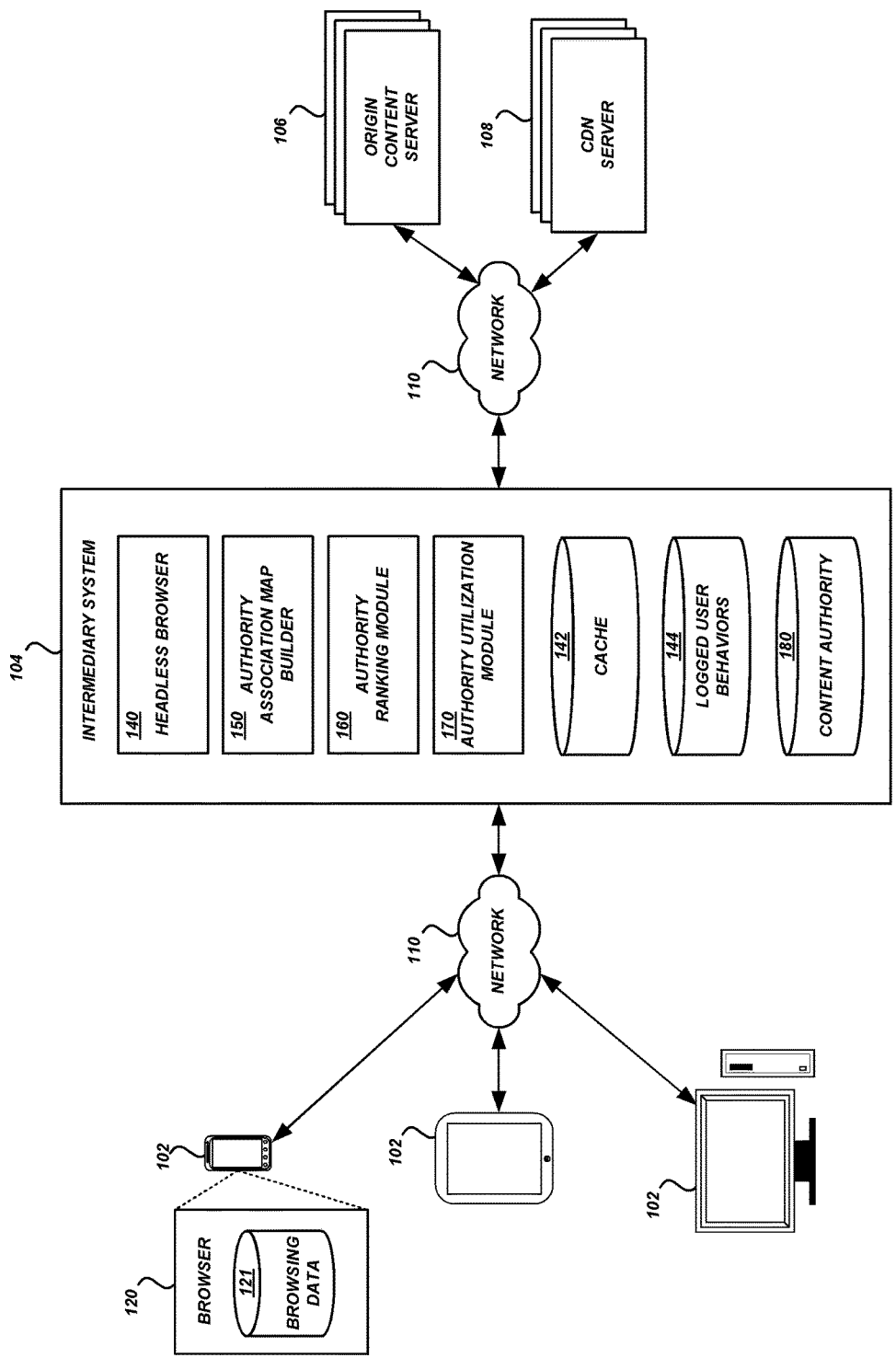
FIG. 1 illustrates a content delivery environment with an intermediary system that determines authority rankings according to one embodiment.

Aspects of the present disclosure relate to systems and techniques for using user behavioral data, for example browsing history data including traffic data, user-provided authority feedback, and/or content sharing data, to determine page and/or domain authority. One embodiment involves an architecture in which the functions of a network content browsing system (e.g., a "web browser" application) are distributed among a browser component running on a server and a browser component running on a user device. The server-based browser component can interact with a number of browser components running on user devices, for example to retrieve and render content (e.g., web pages), and generate, for delivery to a user device, a representation of the content that can be utilized by the user device to display a visual representation of the content. One or both of the server-based browser and the client browser can track and store browsing history data for use in determining page and/or domain authority. In this configuration, the server-based browser component may be referred to as a "headless browser," and the browser component running at the user device may be referred to as a "client browser."

Conventional browser applications executing on a user device typically store certain types of data relating to a user's browsing behavior, referred to as a browsing history. Browsing history can include a list of content pages (e.g., web pages) and content sites (e.g., domains or web sites) a user has visited recently, together with associated data such as page title, time, and duration of visit, and can be recorded by the browser for a predetermined period of time in order to provide the user with a history list and back/forward navigation options. However, the stored data represents the browsing history of just a single user or group of users who have access to the computing device storing the browser application, and not the aggregate browsing histories of large numbers of users. Further, by default this browsing history data is typically not shared, but stored only locally on the user device.

As an alternative to implementing the browser fully on the user device, an intermediary system or system, for example a headless browser implemented on a remote server or other device, can be used to retrieve and format content requested by a client browser as described above. In some embodiments, the intermediary system can receive data from the client browser representing some or all of the browsing history for use in determining authority rankings for content pages and content sites. In other embodiments, the intermediary system can track the user's browsing behavior since it processes some or all of the page requests from the user device. In some embodiments, the intermediary system may track some browsing behavior and receive some browsing behavior from the user device (for example, when the browser running on the user device retrieves pages directly without going through the intermediary system) so that the intermediary system obtains a complete record of the browsing history data. The browsing history data can include traffic data, for example a number of visits to a specific content page, as well as content sharing data (e.g., sharing a content page via social media, for example using a feature built in to the client browser) and user-provided authority feedback data. The traffic data (e.g., number of visits to a page or domain) can be used as an implicit indication of authority, where greater traffic indicates greater authority. Traffic data can be temporal in some embodiments, for example tracking traffic over time order to determine trends in authority or limiting traffic data to the past hours, days, weeks or other time period in order to determine recent authority.

Authority feedback data and content sharing data can be used as explicit indications of the authority of a page or domain. The authority feedback data may be provided by the user for a specific page or domain, for example using a feature built into the client browser, and can indicate a level of authority the user would assign to the page. To illustrate, the client browser can include a user interface having functionality for a user to provide authority feedback, for example a binary rating (e.g., authoritative/not authoritative, thumbs up/thumbs down), numerical rating (e.g., from 1 to 10), or scale rating (e.g., one to five stars) regarding the user-perceived authority of a particular page that the user is visiting. In some embodiments, the authority feedback user interface can be presented to all users for all content pages. In some embodiments, the authority feedback user interface can be presented only to some users, for instance users who are classified as experts or users who have visited greater than a threshold number of pages. In some embodiments, the authority feedback user interface can be presented only for some pages, for example pages associated with the same category as an expert user. The authority feedback user interface may be incorporated into a browser toolbar in some embodiments. The client browser may also support content sharing on social media, for example through sharing functionality built into the browser, and data representing shared content can be used as an explicit authority indication.

In some embodiments, the expert or reputation statuses of users can be measured based on the content they have posted, and/or user ratings of such content. For example, a user who frequently posts customer reviews of electronic items in an electronic commerce system may be considered an expert on electronics, especially if others' ratings of such reviews are favorable. Examples of methods that can be used to measure the reputations of users based on review activities are described in U.S. Pat. No. 7,664,669, the disclosure of which is hereby incorporated by reference.

The intermediary system may store this data anonymously, and may aggregate the browsing history data for a global group of all users and/or categories of users. Global traffic data can provide the intermediary system with implicit authority indications regarding site or domain popularity. User feedback can provide the intermediary system with explicit authority indications regarding site or domain reliability, relevance, or quality. The implicit and explicit authority indications can be associated with specific pages or domains in a content-to-authority association mapping generated by the intermediary system. The intermediary system can then use the authority indications associated with a page or domain to determine an authority of the page or domain.

In one example, the intermediate system can determine a global authority for a page or domain based on one or both of global traffic data and aggregate user feedback. In another example, the intermediate system can determine a categorical authority for a page or domain based on traffic data and/or user feedback among a particular category of users. For example, based on user-provided information or analysis of user behavior, the client browser or intermediary system can classify a user as an "expert" in one or more categories. To illustrate, the intermediary system may categorize a user as an expert in cooking/baking based on one or more of frequent visitation to recipe-related web sites, membership or posts in cooking forums, and purchase history from electronic commerce systems including cooking-related items. A user may be generally categorized as an expert based on factors including higher than average browsing time or page visit numbers and providing more than a threshold amount of feedback regarding page authority. Expert users can be considered authoritative regarding quality pages within categories associated with the user, and the intermediary system may give more weight to authority indications from such users. Categorical authority of pages can provide information about relevance of a page to a particular type of user. User categories can be based on perceived user interest, user device type, user geographic or demographic information, browsing time, and the like. In some embodiments, one or both of global authority and categorical authority may be based on browsing history data from users outside of the category with authority indications from expert users weighted more heavily than authority indications from other users.

In some examples a complete browsing history can be sent from the client device to the intermediary system, and in other examples the client browser can extract implicit and explicit authority indications or perform content to authority association mappings based on the user browsing history and send the extracted indications or association mappings to the intermediary system. The amount or type of data based on browsing history that is shared with the intermediary system may be user-specified.

In various embodiments, the intermediary system can use various aspects of explicit and/or implicit authority indications present in browsing history data in authority determinations. For example, page or domain traffic can be used to determine authority based on popularity, where higher traffic to a page or domain indicates higher authority. The browsing history data can provide temporal trends in authority, for example authority at different times of day, different seasons, and the like, as well as changes in authority over time. In some examples, the duration of a visit to a page and/or the patterns of usage can impact the authority value determined for the page based on that information, for example whether a user came to the page via a referrer, link click, search engine etc. Social signals can also provide implicit authority indications; for example a domain or page that is heavily shared on social media can be assigned a higher authority ranking than a domain or page that is infrequently shared. Authority can be determined in association with device type, for example in order to provide relative authority of a page or domain in mobile device traffic versus traffic from desktop browsers. In some embodiments, the "active and used" linked structure of the network can be taken into account when determining authority. For example, if many active links refer to a page and the active links are frequently followed by users, this would provide a higher authority ranking as opposed to relatively stale links that are not used frequently. Categorical authority can be language and/or location based in order to provide data regarding geographic trends in authority. Authority can also be based at least partly on determining that a page or domain satisfies an information need of a user, for instance by figuring out a browsing session information need through user profile modeling and determining that a particular (e.g., last or longest-visited) page satisfied the information need. The intermediary system can determine that the information need is associated with a topic or category, and the authority of the page that satisfied the information need can be increased in that category. The intermediary system can calculate authority based on a weighted combination of various dimensions and can learn and tune weights dynamically based on web traffic and explicit user feedback.

In some implementations, use of categorical authority for certain content sites can generate a high authority ranking for the content site which would, based solely on general traffic data, receive a lower authority ranking. For example, a particular page or domain that provides expertise on coffee-related items may have a low overall traffic volume, however a large percentage of the sites visitors may be "coffee expert" users. The level of expertise of a user on the topic of coffee can be determined, in some examples, based on the user browsing a number of content sites relating to coffee and associated items (e.g., espresso or cappuccino machines, coffee bean growing books or supplies, coffee bean roasting supplies, and the like), on the user purchasing coffee or associated items from an electronic catalog, and/or on the user submitting content (e.g., creating coffee item reviews, content sites, or coffee forum submissions) relating to coffee or associated items. Accordingly, if a threshold level of users visiting the particular page or domain that provides expertise on coffee-related items are determined to have high expert scores on the topic of "coffee," then the categorical authority ranking for that page or domain in the category of coffee can be high, even if the overall authority ranking is lower due to low traffic volume.

Being able to detect high-quality content across potentially millions of content pages and content sites can enable an intermediary system (or other type of system) to provide beneficial features for users. For example, categorical page and domain authority information can be used to present personalized information to a user. To illustrate, the intermediary system may analyze information associated with the user (e.g., browsing history data, purchase history data, user profile data, and the like) and associate the user with one or more categories. The intermediary system can determine that a page or domain is highly authoritative in the categories and present the page or domain to the user as a recommended site. An intermediary system can also leverage page and/or domain authority for advertisements in some embodiments. For example, pages with high authority rankings in a particular category can be recommended in advertisements to users determined to be associated with the category.

An intermediary system can also leverage page and/or domain authority for other monetization avenues, for example exposing the authority ranking and content analysis of a content page as a service in order to assist users (e.g., creators and/or managers of the pages and domains) in increasing the quality of their content to increase their authority ranking. Users may wish to improve the authority of their pages or domains in order to gain a competitive advantage, receive greater traffic, and thereby increase their sales and/or advertising revenue. Accordingly, the intermediary system may provide a service portal for presenting general information and tips to site owners for improving authority (e.g., update content regularly, involve social media for content sharing). The service portal may also provide detailed analytics of performance based on the authority association mappings (e.g., your page is popular among "expert" users interested in science, your page is popular among laptop users but unpopular among tablet users, etc.) to assist site owners in improving their content. The service portal can be used to present users with information pertaining to any of the associations based on implicit or explicit authority indications described herein, and may present users with a visual representation of page authority over time.

An intermediary system can also leverage page and/or domain authority for improving user experience, for example by providing a presentation modification service to modify presentation of content of pages or domains having low categorical authority rankings on a specific type of device so that the content is more suitably displayed on the device. To illustrate, the presentation modification service may identify a page with a high global authority ranking but a low mobile device authority ranking as a candidate for modifying presentation of content delivered to users requesting the content from mobile devices. The presentation modification service can retrieve the content, determine an original presentation structure as indicated in the document object model of the content page, determine a modified presentation structure based on known mobile device presentation preferences (e.g., presenting smaller portions of content per page than in a laptop browser, providing video content in mobile-compatible formats, delivering content using methods to compensate for slower network connection speeds, and the like), and deliver the content in the modified presentation structure to a user requesting the content from a mobile device.

Although aspects of the embodiments described in the disclosure will focus, for the purpose of illustration, on a distributed browsing system with separate server-based and client-based browser components designed specifically to work in conjunction with one another (e.g., a headless browser instance running on a server and a corresponding client browser instance running on a user device), one skilled in the art will appreciate that the techniques disclosed herein may be applied to any number of services, processes, or applications. For example, the disclosed process may be implemented by a non-intermediary server system that analyzes behavioral data reported by browsers/user devices. In some embodiments, an existing browser application that runs on a user device may be configured to determine page authority rankings. For example, a browser add-in or extension may be installed on a user device to facilitate one or more of communicating with a headless browser or other service, retrieving browsing history data from one or more users, generating page to authority indication association mappings, and ranking pages based on the mapping information.

The authority determination techniques described are herein with reference to content pages and content sites. As used herein, the term "content item" can refer to any content page (for example, a web page) or any content site (for example, a web site or domain).

Various aspects of the disclosure will now be described with regard to certain examples and embodiments, which are intended to illustrate but not limit the disclosure.

System Components

FIG. 1 illustrates an example network environment in which features can be implemented for processing content pages on an intermediary system and generating authority rankings. The network environment shown in FIG. 1 includes various user devices 102, an intermediary system 104, and various content sources, including origin content servers 106 and content delivery network ("CDN") servers 108. The system components may communicate with each other via one or more communication networks 110 in order to deliver content pages hosted on CDN servers 108 and/or origin servers 106 to user devices 102 via intermediary system 104. The intermediary system maintains browsing history data in association with the user devices 102 for use in determining page and domain authority. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104. Further, as mentioned above, the system that analyzes the browsing behaviors and generates authority measures need not operate as an intermediary.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content from, the intermediary system 104 rather than communicating directly with the content source. The browser application 120 may include browsing data storage 121 that stores browsing history data representing user interactions with content provided to the browser application 120. In some embodiments, the browser 120 may be a conventional web browser that is not specifically designed or configured to store or analyze browsing data pertaining to page or domain authority. In some embodiments, browser 120 can be provided with modules that store and communicate information relating to authority determinations, as discussed in more detail with respect to FIG. 2.

The intermediary system 104 can be a computing system configured to retrieve content on behalf of user devices 102 and send the content to the user devices 102. For example, the intermediary system 104 can be a server or group of servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide content retrieval and the authority determination and ranking functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides representations of the content to separate user devices 102 that enable the user devices 102 to cause display of the content. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate a representation of the content usable to display a graphical representation of the content, and transmit the representation to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability. In addition, by providing content page representations to a large number of the user devices 102 and communicating with the user devices 102 over a network, the intermediary system 104 may be able to obtain browsing history data representing visits to and interactions with a large number of content pages and content sites by a large number of users.

The intermediary system 104 may include various modules to provide the authority determination functionality described above and in greater detail below. For example, the intermediary system 104 may include an authority association map builder 150, an authority ranking module 160, an authority utilization module 170, and data repositories for logged user behaviors 144 and content authority 180. The functionalities of and communications between these components is described in more detail with respect to FIG. 2.

As an example, the headless browser may be implemented using the open source Chromium™ browser, with appropriate modifications to implement authority determination the other features described herein. In some embodiments, Chromium™ code may be modified to request and/or receive browsing history data from a number of computing devices of users, analyze the browsing history data, build an authority association map, and determine authority rankings of a number of content pages and/or content sites. Chromium™ code may also be modified to perform the various authority utilization techniques described herein, for example advertising content pages or content sites to specific users, providing a service portal for assisting users with increasing authority rankings of their content pages or content sites, and providing a content display modification service to address content display issues evidenced by categorical authority rankings. In other embodiments, a headless browser component can be developed specifically to implement the authority determination and utilization techniques described herein.

The intermediary system 104 may include additional modules, components, data stores, and the like to provide the features described above and in greater detail below. For example, the intermediary system 104 may include a cache 142 that stores content items received form content sources 106 and 108 and the like. The intermediary system 104 may also include a logged "user behaviors" data store 144 that stores information about user requests and interactions with content as well as browsing data received from user devices.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Although in the examples described herein the intermediary system 104 is configured to communicate with user devices 102 to receive traffic data, in some embodiments the origin content servers 106 and/or CDN servers 108 can be configured to store traffic data and send the traffic data to the intermediary system.

Example Component Communications

Figure 2:
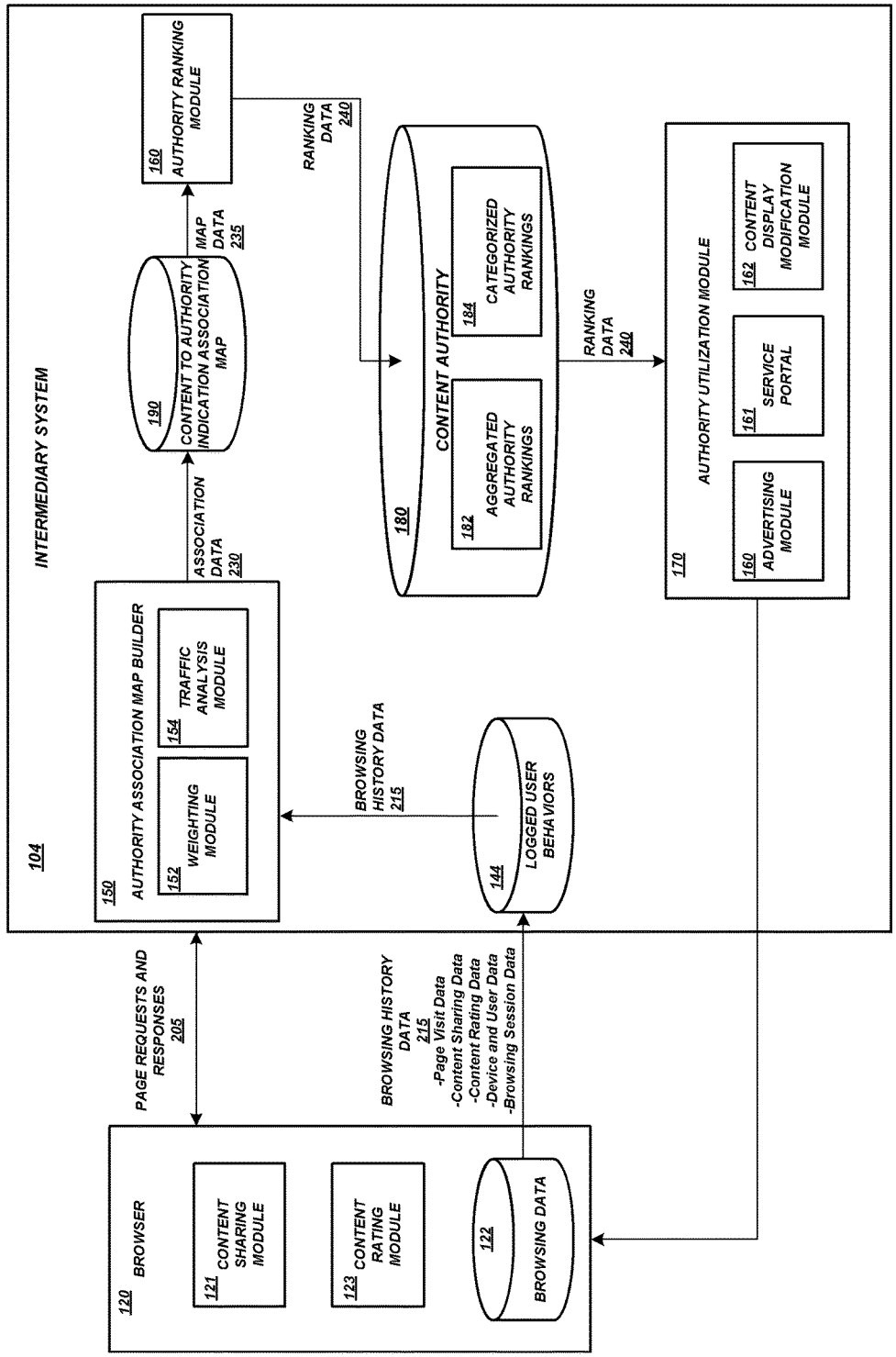
FIG. 2 illustrates example data flows and interactions between a user device and intermediary system during determination of authority rankings according to some embodiments.

FIG. 2 illustrates example data flows and interactions between a user device and intermediary system during generation of authority determinations according to some embodiments. Although the illustrated communications involve the user device 102 and intermediary system 104 of FIG. 1, similar communications can take place between any client device and intermediary system capable of executing the authority determination techniques described herein.

Browser 120 of the user device 102 can include a browsing data repository 122 for storage of browsing history data. Browsing history can include a list of content pages (e.g., web pages) and content sites (e.g., domains or web sites) a user has visited recently together with associated data such as page title, duration of visit, time of visit, and timing and/or location of user zooming and scrolling within the page, and can be recorded by the browser 120 for a predetermined period of time in order to provide the user with a history list and back/forward navigation options.

Browser 120 can also include content sharing module 121 configured to provide a user interface having functionality for the user to share content pages on social media. For instance, the content sharing module 121 can provide an interface as part of a browser toolbar that allows a user to share, using the browser 120, a portion or all of a currently viewed content page using one or more social media accounts belonging to the user. The content sharing module 121 can be configured to store data representing user sharing of content on social media with the browsing history data in data repository 122.

Browser 120 can also include content rating module 123 configured to provide a user interface having functionality for the user to provide authority feedback representing user-perceived authority of content pages on social media. To illustrate, the content rating module 123 can provide, for example as part of a browser toolbar, a user interface having functionality for a user to give provide authority feedback. The feedback can be provided in the form of a binary rating (e.g., authoritative/not authoritative, thumbs up/thumbs down), numerical rating (e.g., from 1 to 10), or scale rating (e.g., one to five stars) regarding the user-perceived authority of a particular page that the user is visiting. The content sharing module 123 can be configured to store data representing the authority feedback with the browsing history data in data repository 122. Content rating module 123 can determine if and when to expose the content rating functionality. For example, content rating module 123 can determine that a user visiting a page is an expert on a topic or category associated with the content page or the content site hosting the content page, and based on that determination the content rating module 123 can prompt the user to provide a rating of the perceived authority of the content page and/or content site relating to the topic.

As illustrated, the browser 120 of the user device 102 can send browsing history data 215 to the logged user behaviors data repository 144 of the intermediary system 104. The browsing history data 215 can include page visit data (e.g., traffic data), content sharing data, content rating data, and browsing session data. In some embodiments, the browsing history data 215 can be accompanied by data representing information about user device 102, for example device type, display size, and configuration of browser 120, to name a few, as well as data representing information about the user, for example a stored user profile. The browser 120 can be configured such that browsing history data 215 is sent to the repository 144 periodically (for example, once per day, at the conclusion of each browsing session, etc.) or at the request of the intermediary system 104.

As illustrated in FIG. 1, intermediary system 104 can include headless browser 140. In some embodiments, the intermediary system 104 may instantiate the headless browser 140 to interface with the client browser 120 to request or receive browsing history data 215 and route received browsing history data 215 to the logged user behaviors repository 144. The intermediary system 104 may additionally or alternatively obtain browsing history data by virtue of being an intermediary (e.g., it may log the page requests 205 that it receives in association with a device or user ID). Data representing page requests and responses 205 can be logged by the intermediary system 104 as part of the browsing history data stored in the logged user behaviors data repository 144.

The authority association map builder 150 can receive the browsing history data 215 from the logged user behaviors data repository 144. For example, the authority association map builder 150 can be configured to update authority associations stored in the content-to-authority indication association map 190 at periodic intervals as needed for generating up-to-date authority rankings for content pages and content sites. As discussed above, the browsing history data 215 can include traffic data representing a number of user visits to each of a number of content pages and content sites as well user interactions including sharing and rating of content pages. User interactions can include various behaviors of a user with respect to a content item, for example providing authority feedback (e.g., a rating) representing the user's perceived authority of the content, sharing of the content or a portion of the content by the user on social media or electronic messaging systems, and bookmarking the content, to name a few. Some or all of these user interactions may be enabled through functionality built into the browser component on the user device. Authority association map builder 150 can be configured to receive the browsing history data from the browser component on the computing devices of a plurality of browser users; identify, based at least partly on analyzing the traffic data, implicit authority indications for each of the plurality of content pages; identify, based at least partly on analyzing the user interactions, explicit authority indications for at least the subset of the plurality of content pages; and build an authority association map associating each of the plurality of content pages with any corresponding implicit authority indications and explicit authority indications.

For example, traffic analysis module 154 can determine the implicit authority indications by analyzing a number of visits to each content page and/or by performing a comparison of number of visits to each content page across a number of content pages. Such page popularity, as determined based on traffic data, represents one factor that can be used to determine authority of a content page or content site. Traffic analysis module 154 can also partition the traffic data into categories, for example based on geographic location of users, page access time of users, page language access of users, and the like, for use in determining categorical authority indications of content pages and content sites.

In some embodiments, weighting module 152 can determine relative weights for a number of factors or authority indications used to determine authority of a content page or content site, for example including determining weights for the implicit authority indication based on traffic data, explicit authority indications based on content shares or content rating, and/or expert user categorical authority indications associated with a page. In certain embodiments, determining user expert authority weightings can be done offline—that is, separate from and in advance of the authority ranking processes described herein—and weighting results can be stored for future use.

In some implementations, weighting module 152 can perform various analyses of user profile data to ascertain a degree of expertise the user has in a particular category or a global expertise of the user. Global expertise of a user can be based, for example, on an amount of browsing history data associated with the user, where more browsing data may indicate a higher level of global expertise, on other users' ratings or votes relating to content submitted by the user, or on other analysis of a quality of content submitted by the user. Global expertise may be used to assign a relatively higher score or weighting to all authority indications determined from a user's behavioral data in some implementations. Some examples of methods that can be used to measure the level of expertise of users based on purchase activity are described in U.S. Pat. No. 7,536,322, the disclosure of which is hereby incorporated by reference. Weighting module 152 can additionally or alternatively analyze the browsing history data 215 corresponding to individual users to determine whether the user is authoritative or expert in a certain category, such as cooking, technology, or the like, and whether to assign a relatively higher weight to authority indications stemming from analysis of the browsing history data corresponding to the user when ranking content pages or content sites associated with the category. Categorical weightings can be used to assign a relatively higher score or weighting to authority indications for pages relating to a particular category. The weighting module may perform such analyses to determine user weighting offline, that is, separately from the authority ranking process, and store the determined user weightings for later use.

The explicit authority indications, implicit authority indications, categorical authority indications, and corresponding weights for each content page can be sent as association data 230 for storage in the content to authority indication association map 190. Examples of authority association mappings and corresponding authority rankings are discussed in more detail below with respect to FIGS. 3A-3D. In some embodiments, association data 230 can also include associations between expert users and categories as well as content pages and the categories. Accordingly, the resulting map data 235 can include both aggregate authority indications as well as categorical authority indications for content pages and content sites, as well as weights for authority indications.

The map data 235 can be output to the authority ranking module 160 for assigning an authority ranking to each of the content pages and/or content sites. The authority ranking module 160 can use the weighted authority indications in the map data 235 to determine one or both of an aggregate authority ranking and a categorical authority ranking (or multiple categorical authority rankings) for content pages and/or content sites. In some examples, authority can be calculated based on a 100-point, logarithmic scale. Thus, it can be easier to increase a content page authority ranking from 20 to 30 than it would be to increase the authority ranking from 70 to 80. Other suitable ranking or scoring methods can be used to determine authority based on the weighted map data 235 in other examples.

The resulting authority rankings can be stored in the content authority data repository 180 and updated as different authority rankings are calculated by the authority ranking module 160. Each content page and content site can be stored in association with an aggregated authority ranking 182. Based on availability of explicit indications by expert users or partitioning of traffic data into categories, some or all content pages and content sites may be stored in association with a categorized authority ranking 184.

The authority ranking technique performed by the authority association map builder 150 and authority ranking module may be performed "offline" by the intermediary system at periodic or irregular intervals in order to provide the content authority data repository 180 with current, updated authority rankings. The authority rankings stored in the content authority data repository 180 can be accessed in "real time" by the authority utilization module 170 in response to use of the authority rankings during user browsing sessions or as a monetized service. Authority utilization module 170 can provide services to the browser 120 of the user device based on the authority rankings.

Authority utilization module 170 can include various modules for monetizing or otherwise utilizing the determined authority rankings. For example, advertising module 160 can use categorical page and domain authority information to present personalized information to a user based on correlating information representing the user with one or more categories, and determining that a page or domain is highly authoritative in the categories. In some examples, advertising module 160 can recommend pages with high authority rankings in a particular category in advertisements to users determined to be associated with the category.

Authority utilization module 170 can also leverage page and/or domain authority for other monetization avenues. For example, service portal 181 can provide a user interface for exposing the authority ranking and content analysis of a content page as a service in order to assist users (e.g., creators and/or managers of the pages and domains) in increasing the quality of their content to increase their authority ranking. Because higher authority rankings may indicate a likelihood of better placement in search results, users may wish to improve the authority of their pages or domains in order to gain a competitive advantage, receive greater traffic, and thereby increase their sales and/or advertising revenue. Accordingly, the intermediary system 104 may provide a service portal 181, for example as an application or content site, for presenting site owners with general information and tips for improving authority (e.g., update content regularly, involve social media for content sharing) as well as detailed analytics of performance based on the authority association mappings (e.g., your page is popular among "expert" users interested in science, your page is popular among laptop users but unpopular among tablet users, etc.) to assist site owners in improving their content. The service portal 181 can be used to present users with information pertaining to any of the associations and implicit or explicit authority indications described herein, and may present users with a visual representation of authority ranking changes over time.

Authority utilization module 170 can also leverage page and/or domain authority for improving user experience, for example by providing content presentation modification service 152 to modify presentation of content of pages or domains having low categorical authority rankings on a specific type of device so that the content is more suitably displayed on the device. To illustrate, the content presentation modification service 152 may identify a page with a high global authority ranking but a low mobile device authority ranking as a candidate for modifying presentation of content delivered to users requesting the content from mobile devices. Content presentation modification service 152 can retrieve the content, determine an original presentation structure as indicated in the document object model of the content page, determine a modified presentation structure based on known mobile device presentation preferences (e.g., presenting smaller portions of content per page than in a laptop browser, providing video content in mobile-compatible formats, delivering content using methods to compensate for slower network connection speeds, and the like), and deliver the content in the modified presentation structure to a user requesting the content from a mobile device. Content presentation modification service 152 can identify other content display problems, for example localization (e.g., foreign language translations) problems, browser type or version display problems, and the like based on disparities between categorical authority rankings.

Example Content to Authority Association Mappings

FIGS. 3A-3D illustrate various examples of authority association mappings and corresponding authority rankings. FIG. 3A illustrates an example of explicit authority associations 305 generated based on user-provided feedback on perceived page quality. As illustrated, five content pages (listed as A.com, B.org, C.net, D.gov, and E.edu) each have a varying number of user scores stored in association with the page. Each user score is accompanied by a user weight, which can be determined based on "expert" status of the user as discussed above, or based on a relative level of association of the user with one or more categories assigned to the content page. Based on the user-assigned ratings and the user weights, the intermediary system 104 can generate a user-given quality score to store as an explicit indication of the authority of each of the pages. Though not illustrated, user shares of the content can also be factored in to the explicit authority indications 305.

FIG. 3B illustrates an example of implicit authority associations 310 based on traffic data analysis. Each of the five content pages shown in the explicit authority associations 305 of FIG. 3A is shown again in the implicit authority associations 310. However, in some examples not all pages associated with implicit authority associations 310 will also be associated with explicit authority associations 305, based on the availability of user-generated content rating data and/or content sharing data. The implicit authority associations 310, represented by the traffic-based score, are based on a number of factors such as total visits to the content page, duration of the existence of the content page, average duration of a visit to the content page, and visits within a predetermined timeframe (for example, to increase the score of a page with a higher number of recent visits even if the page is relatively new or has less total visits than another site). The intermediary system 104 can generate these factors based on analyzing traffic data and assign varying weights to the factors to generate the traffic-based score.

In some embodiments, user characteristics (e.g., the extent to which a given user is an expert on a topic or subject associated with the site or page) may be considered in generating the traffic-based scores. This may be accomplished by, for example, giving more weight to visits by experts, or by determining the fraction of visits that are by experts. In some embodiments, the authority score for a site or page may be a normalized score (e.g., on a scale of 0 to 100) representing the extent to which those who visit the site or page are experts on a topic or subject associated with the site or page.

To illustrate, the intermediary system 104 can record a number of accesses to a content item and can record browsing history data, content posting, data, or other data of the users who accessed the content item. In one embodiment, the intermediary system 104 can determine a first portion of the number of accesses by expert users of the plurality of users and determine a second portion of the number of accesses by non-expert users of the plurality of users, and can generate an authority score for the content item by weighting the first portion of the number of accesses by the expert users more heavily than the second portion of the number of accesses by the non-expert users. In another embodiment, the intermediate system 104 can determine an expert score for some or all users that accessed the content item, determine a number of accesses of the content item by each of the users, and generate an authority score for the content item based at least partly on the expert score for each user and the number of accesses by each user. Expert scores can reflect different degrees of being an expert in some examples, for instance by scoring each user in terms of expertness on a topic. The intermediary system 104 can then determine the average expertise level of those who visit a given page or site for use in calculating the authority score of the page. Expert scores, expert status, and non-expert status may be determined based on analysis of the browsing history, content posting, other users' reaction to or rating of content posted by the user (e.g., thumbs up or thumbs down votes of a product review written by the user for an item in an electronic catalog), purchase history, forum or group membership, or other behavioral data of the users. Accordingly, traffic-based scores can be weighted more heavily with respect to traffic by expert users or users with higher expert scores.

FIG. 3C illustrates an example of global authority rankings 315 for each of the five content pages (A.com, B.org, C.net, D.gov, and E.edu) based on the explicit authority indications 305 represented by the user-given quality score and the implicit authority indications 310 represented by the traffic-based score. As described above, global authority rankings 315 can be based on analysis of all implicit and explicit authority indications associated with a page. The illustrated global authority ranking can be calculated based on a 100-point, logarithmic scale using the user-given quality score and the traffic-based score. Thus, it can be easier to increase a content page authority ranking from 20 to 30 than it would be to increase the authority ranking from 70 to 80. Other suitable ranking or scoring methods can be used to determine authority in other examples.

FIG. 3D illustrates an example of categorical authority rankings 320 for each of the five content pages (A.com, B.org, C.net, D.gov, and E.edu). As described above, categorical authority rankings 320 can be based on analysis of a subset of the implicit and explicit authority indications associated with a page, for example relating to a specific type of traffic data or a specific type of user. The ranking categories illustrated provide some non-limiting examples of categories that can be useful for categorical authority rankings 320. For example, looking at the ranking categories associated with E.edu, it is apparent that E.edu has higher authority among users of personal computers (e.g., desktop and laptop computers) than among mobile device users (e.g., smartphone users). This disparity in categorical rankings can be used by the service portal 161 or content display modification module 162 as described above.

Example Authority Determination Techniques

Figure 4:
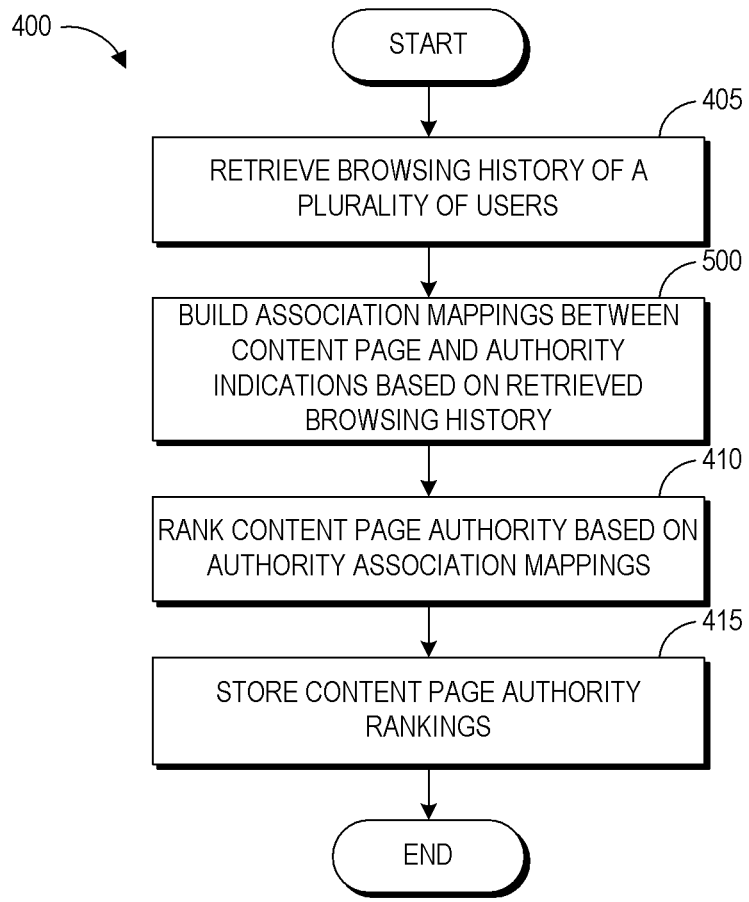
FIG. 4 illustrates an embodiment of an authority determination technique as implemented by an intermediary system.

FIG. 4 illustrates an embodiment of an authority determination technique 400 as implemented by an intermediary system. The authority determination technique 400 can be performed by the authority association map builder 150 and authority ranking module 160 of intermediary system 104 in some embodiments, and may be performed "offline" at periodic or irregular intervals in order to provide current authority rankings.

At block 405, the authority association map builder 150 can retrieve, from logged user behaviors data repository 144, browsing history data including traffic data indicating visits by the plurality of browser users to a plurality of content pages of a plurality of content sites and user interactions with content of at least a subset of the plurality of content pages.

At block 500, the authority association map builder 150 can build content to authority association mappings between content page and authority indications based on retrieved browsing history. As described above, such association mappings can include associations between content pages and content sites with implicit authority indications based on global and/or categorized traffic data and explicit authority indications based on user-provided content ratings and/or content shares. The association mappings can also include associations between specific users, authority indications provide by browsing history data of the specific users, page categories, and content pages and content sites. Further details of the content to authority association map building are discussed with respect to FIG. 5. In some embodiments, building the content to authority association map can include generating user expert scores representing an extent to which particular users are experts on topics/subjects of the content they have browsed. As discussed above, expert scores may be determined based on analysis of behavioral data of a user, for example one or more of the browsing history, content posting, other users' reaction to or rating of content posted by the user (e.g., thumbs up or thumbs down votes of a product review written by the user for an item in an electronic catalog), purchase history, or forum or group membership, of the user.

At block 410, the ranking module 160 can rank content page authority based on the content to authority association mappings. For example, the ranking module 160 can use weights associated with a number of factors as shown in FIGS. 3A-3D to generate a global authority ranking for each page and categorical authority rankings for some or all pages.

At block 415, the intermediary system 104 can store the content page authority rankings for later use. One use of authority rankings, for example, involves use in monetization services such as advertising, content service portal provision, and content display modification as described above. Other uses of authority rankings include determinations regarding what pages to present to a user, for instance in response to a keyword search or other query.

Figure 5:
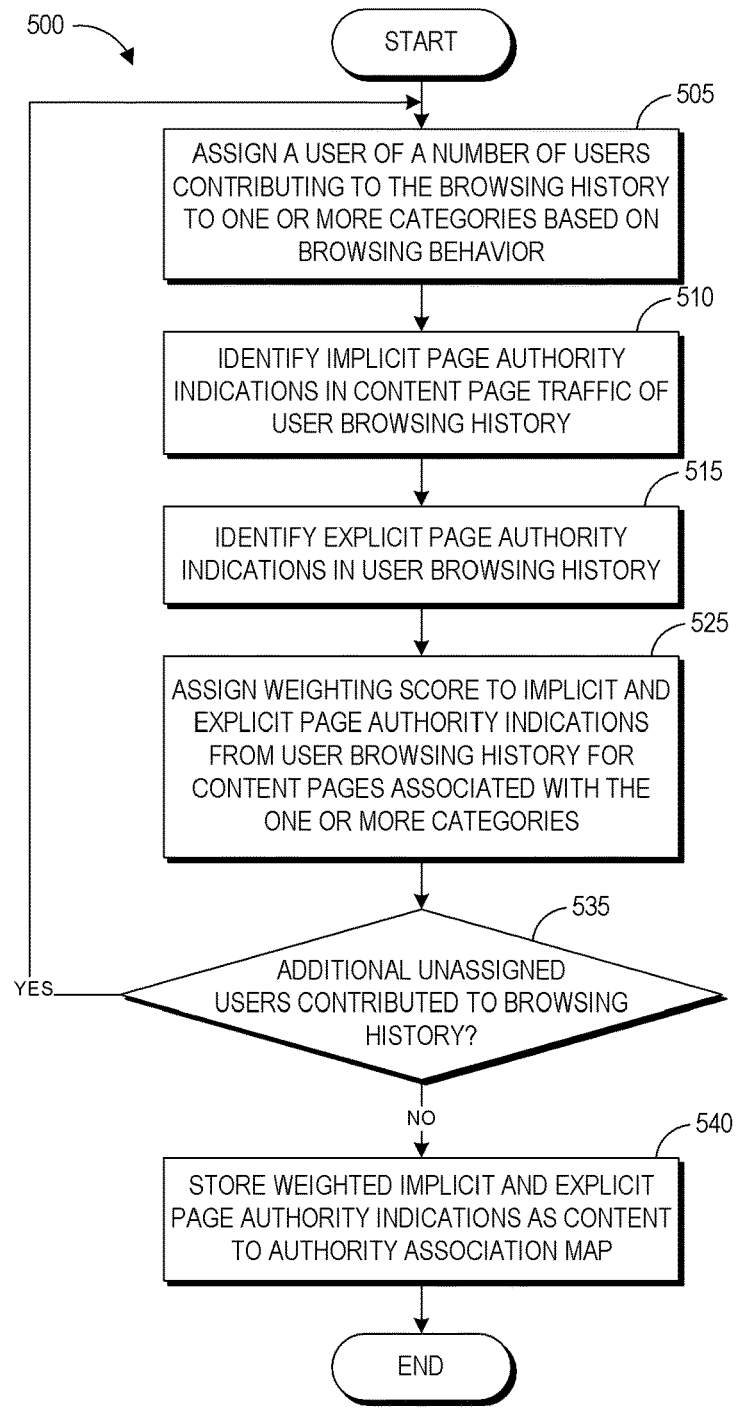
FIG. 5 illustrates an embodiment of a content to authority association map generation technique that can be used with the authority determination techniques described herein.

FIG. 5 illustrates an embodiment of a content to authority association map generation technique 500 that can be used with the authority determination techniques described herein. The content to authority association map generation technique 500 can be performed by the authority association map builder 150 of intermediary system 104 in some embodiments, and can be included as block 500 of the authority determination technique 400.

At block 505, the authority association map builder 150 can assign a user of the plurality of users who have contributed to the browsing history data to one or more categories based on analysis of the browsing behavior of the user. For example, if the user has made more than a threshold number of visits to technology-related content pages then the user can be associated with a category of "technology." The authority association map builder 150 may associate a user with a category of "cooking/baking" based on the user traffic data indicating more than a threshold number of visits to cooking, baking, or recipe-related web sites. Other aspects of the browsing history data can be used to associate the user with categories in other examples, for instance types of content pages shared or rated by the user.

At block 510, the authority association map builder 150 can identify implicit authority indications in the traffic data of the user's browsing history. The authority association map builder 150 can selectively store only implicit authority indications associated with pages that are also associated with the category or categories of the user in some embodiments.

At block 515, the authority association map builder 150 can identify explicit authority indications in the user browsing history, for example from content sharing or content rating actions that the user has taken. The authority association map builder 150 can selectively store only explicit authority indications associated with pages that are also associated with the category or categories of the user in some embodiments.

At block 525, the weighting module 152 of the authority association map builder 150 can provide a weighting or expert score for the implicit and/or explicit page authority indications extracted from the browsing history of a particular user with respect to content pages associated with the one or more categories. For example, if the user is determined to be an expert or to have a high degree of expertise (generally or in the one or more categories), then the weighting module 152 can assign expert weighting to implicit and explicit page authority indications determined from the user's browsing history in association with content pages that are also associated with the one or more categories. Expert weighting may be a standard high weighting or may be a variable score on a scale of possible scores based on a level of expertise determined for the user. For example, if the user frequently visits technology-related content pages, is a member and/or prolific poster within technology-related forums, or has a purchase history from an electronic commerce system indicating interest in technology (for instance by frequently purchasing books on the topic) then the user can be determined as an expert in the category of "technology." The authority association map builder 150 may determine that the user is an expert in the category of "cooking/baking" based on one or more of frequent visitation to recipe-related web sites, membership or posts in cooking forums, and a purchase history from electronic commerce systems including cooking-related items. Accordingly, the authority indications gleaned from the browsing behavior of the user can have a greater impact on a categorical authority ranking for the content pages than authority indications gleaned from the browsing behavior of non-expert users.

In some scenarios, the user may be determined to not be an expert or to have a low degree of expertise (generally or in the one or more categories), and the weighting module 152 can assign standard weighting to implicit and explicit page authority indications determined from the user's browsing history in association with content pages that are also associated with the one or more categories. Standard weighting may be a standard low weighting or may be a variable score on a scale of possible scores based on analysis of the user browsing history. Accordingly, the authority indications gleaned from the browsing behavior of the non-expert or less-expert user can have a less significant impact on a categorical authority ranking for the content pages than authority indications gleaned from the browsing behavior of expert users. As discussed above, the expert scores can be generated offline by the weighting module 152 and retrieved during the authority ranking process 500.

At decision block 535, the association map building service 150 can determine whether there are additional unassigned users that contributed to the browsing history. An unassigned user can be a user who has not yet been associated with categories and/or determined to have expert or non-expert status within the categories.

If there are additional unassigned users that contributed to the browsing history, then the process transitions back to block 505 to assign a next user to one or more categories based on an analysis of that user's browsing behavior. Accordingly, blocks 505 through 535 are repeated until all users who have contributed to the browsing history are assigned a status of expert or not expert.

Once there are no additional unassigned users that contributed to the browsing history, then the process transitions back to block 540 to store weighted implicit and explicit page authority indications in content to authority indication association mappings, for example for use in determining categorical authority rankings of pages. After storing the content to authority indication association mappings the process 500 ends.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for assigning authority rankings to content items, the system comprising:
   a browser component adapted to run on computing devices of a plurality of browser users, the browser component configured to cause storage of browsing history data in a memory, the browsing history data comprising:
      traffic data indicating visits by the plurality of browser users to a plurality of content items of a plurality of content sites, and
      user interactions with content of at least a subset of the plurality of content items; and
   an intermediary system that communicates over a network with the browser component adapted to run on the user device, the intermediary system comprising one or more processors configured to:
      receive the browsing history data from the browser component on the computing devices of a plurality of browser users,
      generate, based at least partly on analyzing the traffic data, implicit authority indications for each of the plurality of content items, wherein generating the implicit authority indication for a content item having content on a particular topic comprises (1) generating, for each of a plurality of users that access the content item, a respective expertise score for the topic, the expertise score based at least partly on how frequently the respective user accesses other content items on said topic as determined from the traffic data; and (2) using an average of the expertise scores of the plurality of users to generate an implicit authority score for the content item,
      generate, based at least partly on the user interactions, explicit authority indications for at least the subset of the plurality of content items,
      build an authority association map associating each of the plurality of content items with any corresponding implicit authority indications and explicit authority indications, and
      assign authority rankings to specific content items based at least partly on the authority association map, wherein the authority rankings indicate one or both of page authority representing relevance of content of the specific content items to particular topics and domain authority representing the reliability and relevance of the specific content items to the particular topics.

2. The system of claim 1, wherein the browser component includes a content sharing module configured to provide a user interface having functionality for the user to share content items on social media, the user interactions including sharing of content items by the user on social media.

3. The system of claim 2, the content sharing module configured to cause storage of data representing user sharing of content on social media with the browsing history data.

4. The system of claim 1, wherein the browser component includes a content rating module configured to provide a user interface having functionality for the user to provide authority feedback representing user-perceived authority of content items, the user interactions including user-provided authority feedback.

5. The system of claim 4, the content rating module configured to cause storage of data representing the authority feedback with the browsing history data.

6. The system of claim 4, wherein the functionality of the user interface comprises one of a numerical rating system, binary rating system, and scale rating system for enabling the user to provide the authority feedback.

7. The system of claim 1, wherein the authority rankings indicate page authority.

8. The system of claim 1, wherein the authority rankings indicate domain authority.

9. The system of claim 1, wherein the authority rankings indicate both of page authority and domain authority.

10. A system for assigning authority rankings to content items, the system comprising:
   a map building service comprising one or more processors configured to:
      receive browsing history data from computing devices of a plurality of browser users, the browsing history data comprising:
         traffic data indicating visits by the plurality of browser users to a plurality of content items of a plurality of content sites, and
         user interactions with content of at least a subset of the plurality of content items,
      generate, based at least partly on analyzing the traffic data, implicit authority indications for each of the plurality of content items, wherein generating the implicit authority indication for a content item having content on a particular topic comprises (1) generating, for each of a plurality of users that access the content item, a respective expertise score for the topic, the expertise score based at least partly on how frequently the respective user accesses other content items on said topic as determined from the traffic data; and (2) using an average of the expertise scores of the plurality of users to generate an implicit authority score for the content item,
      generate, based at least partly on the user interactions, explicit authority indications for at least the subset of the plurality of content items, and build an authority association map associating each of the plurality of content items with any corresponding implicit authority indications and explicit authority indications; and an authority ranking service comprising one or more processors configured to assign authority rankings to specific content items based at least partly on weighting the implicit and explicit authority indications in the authority association map, wherein the authority rankings indicate one or both of page authority representing relevance of content of the specific content items to particular topics and domain authority representing the reliability and relevance of the specific content items to the particular topics.

11. The system of claim 10, the user interactions comprising user-provided authority feedback representing user-perceived authority of at least some of the plurality of content items.

12. The system of claim 10, the user interactions comprising social media sharing by a user of a content item.

13. The system of claim 10, wherein the map building service is further configured to associate one or more users and one or more content items with a category.

14. The system of claim 10, further comprising an authority utilization module configured provide a service portal for a content item of the plurality of content items.

15. The system of claim 14, wherein the service portal comprises a user interface displaying data representing an authority ranking assigned to the content item.

16. The system of claim 14, wherein the service portal comprises a user interface displaying trend data illustrating change in an authority ranking assigned to the content item over time.

17. The system of claim 14, wherein the service portal comprises a user interface displaying tips for improving an authority ranking assigned to the content item.

18. The system of claim 10, further comprising an authority utilization module configured to use the authority ranking assigned to a content item to dynamically adjust a presentation of the content item for a user visit to the content item.

19. A method for assigning authority rankings to content items, the method comprising, by an intermediary system that operates as an intermediary between user devices and content servers:

receiving browsing history data from computing devices of a plurality of browser users, the browsing history data comprising:
traffic data indicating visits by the plurality of browser users to a plurality of content items of a plurality of content sites, and
user interactions with content of at least a subset of the plurality of content items, generating, based at least partly on analyzing the traffic data, implicit authority indications for each of the plurality of content items, wherein generating the implicit authority indication for a content item having content on a particular topic comprises (1) generating, for each of a plurality of users that access the content item, a respective expertise score for the topic, the expertise score based at least partly on how frequently the respective user accesses other content items on said topic as determined from the traffic data; and (2) using an average of the expertise scores of the plurality of users to generate an implicit authority score for the content item;

generating, based at least partly on the user interactions, explicit authority indications for at least the subset of the plurality of content items; and building an authority association map associating each of the plurality of content items with any corresponding implicit authority indications and explicit authority indications; and assigning authority rankings to specific content items based at least partly on weighting the implicit and explicit authority indications in the authority association map, wherein the authority rankings indicate one or both of page authority representing relevance of content of the specific content items to particular topics and domain authority representing the reliability and relevance of the specific content items to the particular topics;

wherein the intermediary system comprises one or more computing devices and is separate from the user device.

20. The method of claim 19, wherein the user interactions comprise one or more of user-provided authority feedback of a content item of the plurality of content items, social media sharing of the content item, and bookmarking of the content item.

21. The method of claim 19, further comprising:
assigning a user of the plurality of users to at least one category based on a portion of the browsing history data associated with the user;
determining one or more content items of the plurality of content items associated with the at least one category;
identifying, based at least partly on analyzing the portion of the browsing history data associated with the user, categorical authority indications comprising implicit authority indications and explicit authority indications associated with the at least one category;
including, in the authority association map, associations between the subset of the categorical authority indications and the one or more content items; and
determining whether the user is an expert in the at least one category.

22. The method of claim 21, the method further comprising, in response to determining that the user is an expert in the at least one category, assigning a relatively higher weighting to the categorical authority indications when ranking the one or more content items.

* * * * *